US008682789B2

(12) United States Patent
Davoodi et al.

(10) Patent No.: US 8,682,789 B2
(45) Date of Patent: Mar. 25, 2014

(54) METHOD AND SYSTEM FOR EFFECTING PAYMENT TO A MUNICIPALITY AND RECEIVING A CERTIFICATE OF PAYMENT

(75) Inventors: Radni Davoodi, East Hills, NY (US); Raymond Y. Davoodi, Roslyn Heights, NY (US); Nicholas Yannello, Muttontown, NY (US)

(73) Assignee: Municipality Real Time Payments Systems, LLC, Great Neck, NY (US)

( * ) Notice: Subject to any disclaimer, the term of this patent is extended or adjusted under 35 U.S.C. 154(b) by 0 days.

(21) Appl. No.: 13/591,551

(22) Filed: Aug. 22, 2012

(65) Prior Publication Data

US 2014/0058931 A1 Feb. 27, 2014

(51) Int. Cl.
*G06Q 40/00* (2012.01)
(52) U.S. Cl.
USPC ............................................... 705/40; 705/35
(58) Field of Classification Search
USPC ..................................................... 705/35–40
See application file for complete search history.

(56) References Cited

U.S. PATENT DOCUMENTS

| 6,711,554 | B1 | 3/2004 | Salzmann et al. |
| 7,085,735 | B1 | 8/2006 | Hall et al. |
| 7,720,688 | B1 | 5/2010 | Baron et al. |
| 7,742,991 | B2 | 6/2010 | Salzmann et al. |
| 7,822,690 | B2 | 10/2010 | Rakowicz et al. |
| 8,024,261 | B2 | 9/2011 | Erbey et al. |
| 8,140,440 | B1 | 3/2012 | Rakowicz et al. |
| 2002/0029194 | A1* | 3/2002 | Lewis et al. ..................... 705/39 |
| 2005/0119908 | A1 | 6/2005 | Hippe et al. |
| 2006/0122880 | A1 | 6/2006 | Franco et al. |
| 2012/0005071 | A1 | 1/2012 | Erbey et al. |

* cited by examiner

*Primary Examiner* — Thu Thao Havan
(74) *Attorney, Agent, or Firm* — Carter, Deluca, Farrell & Schmidt, LLP

(57) ABSTRACT

A real estate closing payment system and method for transferring funds of a closing party to a municipality, where the funds are associated with fees due with respect to a particular real estate property, is provided. The system includes a registration module configured to register the closing party and a funding source of which the funds will be transferred from, a calculation module configured to calculate an amount of the funds due to the municipality, a transfer module configured to transfer the funds from the funding source of the closing party to the municipality, and a certification module configured to generate a certificate of payment and deliver the certificate of payment to the closing party, municipality, and/or an appropriate recording institution.

7 Claims, 8 Drawing Sheets

METHOD AND SYSTEM FOR EFFECTING PAYMENT TO A MUNICIPALITY AND RECEIVING A CERTIFICATE OF PAYMENT

FIELD OF THE INVENTION

The present disclosure relates to a method and system for use in a real estate closing transaction. More specifically, the present disclosure relates to a method, and system, for paying fees and taxes associated with a particular real estate transaction to a designated party or parties, and receiving a certificate of payment, i.e. a payment confirmation, for recording with an appropriate recording institution, i.e. the office of the county clerk.

BACKGROUND

A closing for a real estate transaction is considered to be the final step in the transaction where the property is transferred from one party to another or where an interest in the property is transferred from one party to another. Additionally, the closing may also include situations where an individual is refinancing a loan on a particular real estate property. In any type of real estate closing, many individuals are involved and countless documents and payments exchange hands in order to complete a transfer from one party to another party. During the closing, many individuals may be present for several different purposes including, for example, buyers, sellers, lenders, loan officers, brokers, title companies, insurance companies, agents, closers, attorneys, or representatives for any party. For example, a title company or title insurance company may have an agent or closer at the closing representing the title company's or the title insurance company's interest in the transaction.

Many documents and payments are involved in a real estate closing, depending on the type of transfer in interest involved. Of the documents required, many must be obtained prior to the closing, and some must be recorded subsequent to the closing with the appropriate recording institution. The parties involved in the transaction prepare in advance, in many cases with each other, to obtain the necessary documents and payments due for the closing.

Additionally, upon closing, several payments may be due to various parties, for example, lenders, lien holders, and municipalities. Some of the information and documents required are readily available for the necessary party and are easily and quickly obtainable. For example, some records are easily accessible online at a particular party's website, or may be quickly accessed via email or fax. However, many of the documents require physical appearances, for example at an office, or written requests to obtain documents which can take time, effort, and could be costly. Additionally or alternatively, it may be necessary for documents to be recorded with the proper recording institutions prior to the closing, during the closing, and subsequent to the closing. In particular, when payments are due, the delay in time and exchange of multiple hands before arriving at the final destination may prove costly in delayed payments due to additional interest fees associated with the interest for the amount of time it takes for the payment to ultimately be delivered to the party and delayed payment fees.

The traditional method of recording a document in the state and/or county clerk's records involved a very lengthy process involving funds exchanging multiple hands and funneling through various accounts, beginning with the initial release from the funding source to its ultimate destination, for example, a municipality. In many scenarios, the funds that are required to be paid, for example to a municipality or other appropriate designation, are entrusted to a party at the closing, for example to a title closer representing the title company or title insurance company, as a check made payable to that party, the title company, or the title insurance company.

In the traditional method, upon receiving the funds at the closing, the title company begins a lengthy process which takes time, adds unnecessary costs, may be prone to errors, and has the potential for fraud. For example, if any errors, such as typographical errors, are present on documents that must be recorded with the appropriate recording institutions, for example and without limitation, the state and/or county clerk, the recording will be rejected and the payment will not be accepted at that time. Thus, in this scenario, the title company or title insurance company must obtain the documentation again, without the errors, which takes additional time to complete, and the documents do not get recorded with the appropriate recording institution until the corrected documents are obtained.

The title company deposits all respective monies into a clearing account, for the purpose of ultimately transferring the funds to the appropriate destination or designated parties. The clearing account is a temporary account containing the costs or amounts that are due to be transferred to another account where the payments are due, established for the purpose of paying the amounts due to the designated parties. The appropriate destination, and/or designated parties, could include any number of destinations including any municipalities, the New York City Department of Finance, the New York State Department of Taxation and Finance, municipalities associated with a state, county, city, town, or village, including but not limited to the Department of Taxation and Finance, receiver of taxes, traffic department, violations bureau, water department, sewer department, building department, housing preservation department, highway department, etc. The title company may then transfer the funds from the clearing account to the appropriate individual destination accounts, process the documents with cover sheets, issue checks in the amount of the taxes made payable to each department or designated party, send the documents out to the designated party, municipality, and/or appropriate recording institution, where the funds are finally deposited into the designated party accounts, municipality accounts, and/or recording institution accounts, and the documents are officially recorded with the appropriate recording institution.

The traditional method is an inefficient means for achieving the ultimate goals of both validating, securing ownership and/or lien position, and paying the appropriate taxes due to the appropriate county and/or state, paying the appropriate fees due to the designated parties, and/or recording appropriate documents with the appropriate recording institution. Additionally, the traditional method may also impose unnecessary liability on particular parties for example, by the funds unnecessarily exchanging multiple hands before arriving at the final destination. Further, under the traditional method, there is a large delay in time from the moment of the closing and the point at which the designated parties receive the payments due to them which can be a natural delay or which can be caused by a number of factors. For example, there could be a miscalculation of taxes due to a particular municipality, a delay in delivery time between the title closer and title company or title insurance company, bank attorney or an agent of the bank misusage of the funds, for example by means of theft or fraud, leading to insufficient funding which causes the title company checks to bounce, personnel error within the title company or the title insurance company, or any other party to the transaction, in processing documents and/or funds, misusage of funds within the title company, title insurance company, or any other party, for example by means of theft and/or fraud, title company or title insurance company and borrower conspiring to hold back a mortgage from being recorded, for example, by keeping the mortgage tax and causing the lender to have an unsecured lien, title company or title insurance company personnel delay in processing and delivering documents, title company or title insurance company personnel error in processing document and funds, causing the municipality to reject the documents and the funds.

Thus, there exists a need for a payment and certification of payment method and system for delivering funds to designated parties and receiving a certification of the funds delivered for recording documents with appropriate recording institutions. In particular, there exists a need for a payment method and system for paying fees due to municipalities during a real estate closing transaction and a method and system for providing a certification of the payments made for recording with the appropriate recording institutions, i.e. the county clerk. Additionally, or alternatively, there exists a need for alerting a municipality, and/or other interested parties, that a transaction has taken place, thus eliminating the possibility of fraudulent activities and multiple transactions taking place at once.

SUMMARY OF THE INVENTION

The present disclosure is directed to a municipality payment and certification method and system.

A payment system for transferring funds of a user to at least one designated party for a particular transaction, according to a preferred embodiment of the present disclosure, includes a registration module, a calculation module, a transfer module, and a certification module. The registration module may be configured to receive corresponding to at least one user and at least one funding source of which the funds are transferred from. The calculation module may be configured to calculate an amount of the funds to be transferred from the funding source. The transfer module may be configured to transfer the funds from the funding source to the designated party, i.e. a municipality, based on the calculated amount of funds calculated by the calculation module. The certification module may be configured to generate a certificate of payment and deliver the certificate of payment to the user. The certification module may further be configured to deliver the certificate of payment to the designated party and/or any party designated by the user, such as a recording institution. The recording institution may be an office associated with the county clerk. The calculation module may calculate the amount of funds to be transferred from the funding source by analyzing the particular transaction and determining the amount of funds to be transferred. At least one of the designated parties may be a municipality. Additionally, the funds may be transferred due to a transfer of an interest in a real estate property from a first party to a second party. Additionally, or alternatively, the transfer of funds may be immediate or may be delayed for a predetermined period of time. The certificate of payment may include images of the real estate property, parcel identification information of the real estate property, and/or images of documents corresponding to the particular real estate closing transaction of the real estate property.

A real estate closing payment system for transferring funds of at least one closing party to at least one municipality, where the funds are associated with fees due with respect to a particular real estate property, is also provided. The real estate closing payment system includes a registration module, a calculation module, a transfer module, and a certification module. The registration module may be configured to receive information corresponding to the closing party and a funding source of which the funds will be transferred from. The calculation module may be configured to calculate an amount of the funds due to the municipality. The transfer module may be configured to transfer the funds from the funding source of the closing party to the municipality. The transfer module may transfer the funds immediately, or may delay the transfer after a predetermined period of time. The certification module may be configured to generate a certificate of payment and deliver the certificate of payment to the closing party. Additionally or alternatively, the certification module may be configured to deliver the certificate of payment to a recording institution, such as and without limitation, an office associated with a county clerk. The certificate of payment may include images of the real estate property, parcel identification information of the real estate property, and/or images of documents corresponding to the particular real estate closing transaction of the real estate property.

A payment method also provided. The payment method includes enabling a user to access a payment system which includes a system administrator configured to oversee a transfer of funds through the payment system. The method includes the steps of identifying a funding source where the funds are to be transferred from, identifying a designated party associated with a funding destination where the funds are to be transferred to, receiving information identifying a payment destination, receiving information corresponding to a closing transaction, determining the amount of funds to be transferred from a funding source to a funding destination, generating a certificate of payment, and delivering the certificate of payment. The user may designate the destination, and/or the user may select the destination from a list of destinations stored in the database. The designated party may be a municipality. A user may designate a delivery destination for the certificate of payment. The amount of funds to transfer may be inputted by the user, may be inputted by the designated party, and/or may be calculated by the payment system. The certificate of payment may include images of the real estate property, parcel identification information of the real estate property, and/or images of documents corresponding to the particular real estate closing transaction of the real estate property.

A method for transferring funds to a designated party for a particular transaction is also provided. The method includes receiving information corresponding to a user and a funding source, calculating an amount of funds to transfer, transferring the funds from the funding source to the designated party, generating a certificate of payment, and delivering the certificate of payment to the user. The certificate of payment may also be delivered to the designated party, any party designated by the user, and/or an appropriate recording institution such as an office associated with a county clerk. The certificate of payment may include images of the real estate property, parcel identification information of the real estate property, and/or images of documents corresponding to the particular real estate closing transaction of the real estate property. The step of calculating the amount includes analyzing the particular transaction and determining the amount of funds to transfer. The designated party may be a municipality. The method may further include the step of storing the information in a database.

Also provided is a method for transferring funds of a closing party in a real estate closing transaction to a municipality, where the funds are associated with fees due with respect to a particular real estate property, including receiving information corresponding to the closing party and a funding source of which the funds originate, calculating an amount of funds due to the municipality, transferring the funds from the funding source of the closing party to the municipality, generating a certificate of payment, and delivering the certificate of payment to the closing party. The certificate of payment may further be delivered to a recording institution such as and office associated with a county clerk.

Also provided is a non-transitory computer-readable storage medium storing a program for causing a computer to execute a method including the steps of enabling a user to access a payment system which includes a system administrator configured to oversee a transfer of funds through the payment system, identifying a funding source where the funds are to be transferred from, identifying a designated party associated with a funding destination where the funds are transferred to, receiving information corresponding to a closing transaction, determining an amount of funds to transfer from the funding source to the funding destination, transferring the funds from the funding source to the funding destination, generating a certificate of payment, and delivering the certificate of payment.

BRIEF DESCRIPTION OF THE DRAWINGS

The accompanying drawings, which are incorporated in and constitute a part of this specification, illustrate embodiments of the disclosure, and together with a general description of the disclosure given above, and the detailed description of the embodiments given below, serve to explain the principles of the present invention.

DETAILED DESCRIPTION

Figure 1:
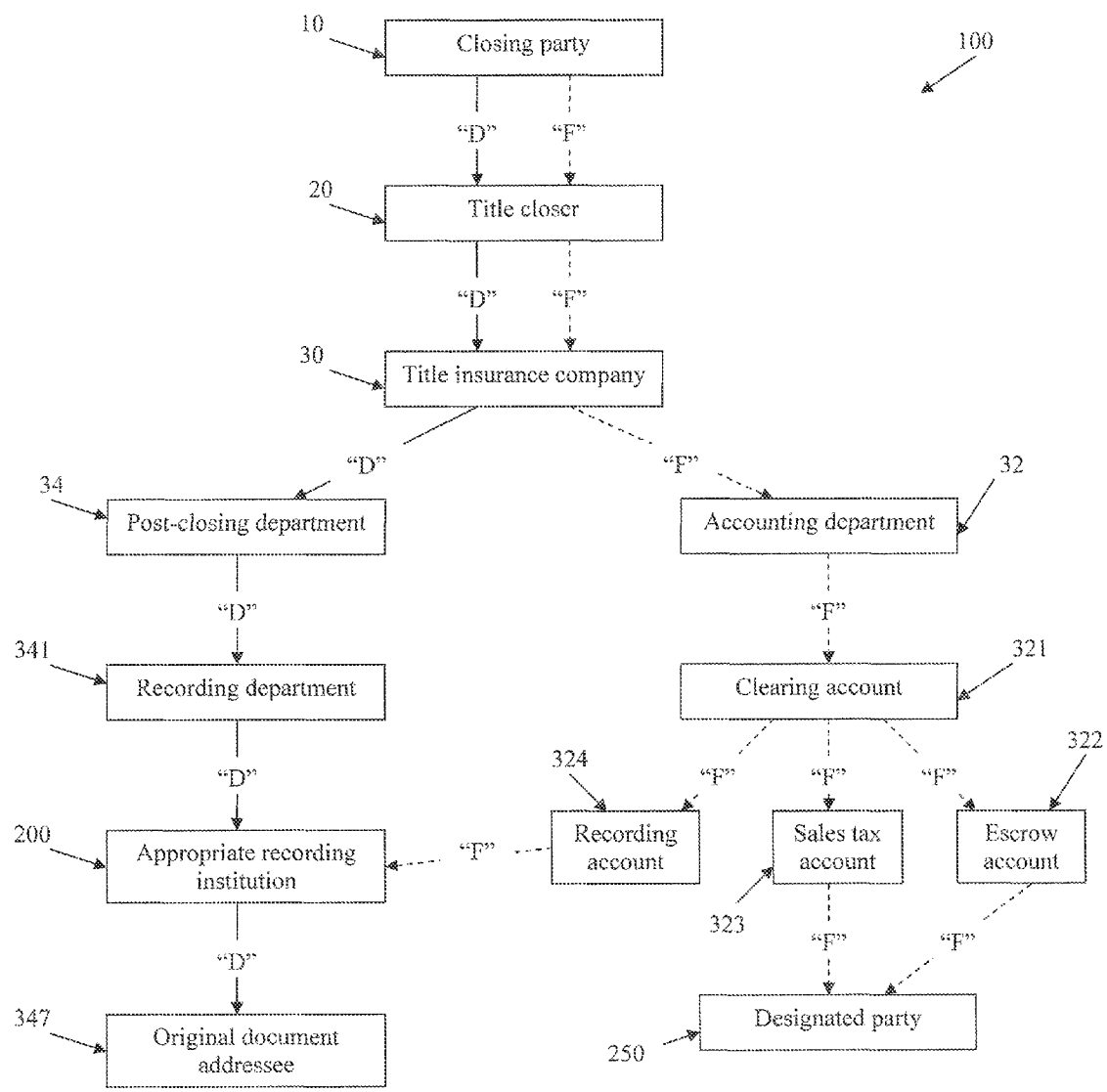
FIG. 1 is a flow chart of the transfer of documents and funds according to the traditional method of a real estate closing transaction.

Referring to FIG. 1, a traditional method 100 of a closing for a real estate transaction is shown. In the traditional method 100 of a closing for a real estate transaction, there exists a closing party or parties 10 and a title closer 20. The closing parties 10 may include any individuals that have an interest in the transaction taking place, such as and without limitation, a buyer, seller, lender, buyer's attorney or representative, seller's attorney or representative, bank attorney, and/or any agents associated with any of the closing parties 10. The closing party 10 may further include attorney administrators, attorney, employees, mortgage administrators, mortgage loan officers, mortgage processors, buyers, sellers, and/or any other individuals. The title closer 20 is an agent, i.e. representative, of the title insurance company 30. The title insurance company 30 may include a title insurance company, a title company not particularly associated with insurance policies, and/or a title agent. It is understood, however, that the title insurance company 30 may include any or all of the title closer 20, the title company, title agent, and/or underwriters of a title insurance policy. The title closer 20 receives documents "D" and funds "F" at the closing by the closing parties 10 and title closer 20 delivers all documents "D" and funds "F" received at the closing transaction to the title insurance company 30 as will be described in further detail below. When the title insurance company 30 is associated with a particular insurance policy, the title closer 20 will exchange the documents "D" and funds "F" for the appropriate insurance policies.

The documents "D" received by the title closer 20 may include documents "D" that are required to be filed, or desired to be filed, by the title insurance company 30 with an appropriate recording institution 200, as will be described in further detail below. The documents "D" as described throughout this specification may include any documents associated with a real estate closing transaction. For example, documents "D" may include any documents such as, and without limitation, mortgages, deeds, assignments, power of attorney, consolidation modification extension agreements, any affidavits including 255 affidavits, 253 affidavits, 256 affidavits, 260 affidavits, 275 affidavits, satisfaction or discharge of mortgage, exemption affidavits, tax lien releases for both state and federal, tax lien certificates for both state and federal, Lis Pendens, judgments, satisfaction of judgments, any UCC documents including UCC-1, UCC-3, and UCC-6, discharge of construction lien claim, subordinations, home equity lines of credit, spreader agreements, splitter agreements, mechanic liens, release of mechanic liens, leases for both residential or commercial, assignment of leases and rents, termination of leases and rents, contracts of sale, condominium common charge lien, condominium common charge lien release, condominium unit lease, owner estoppels, covenants, restrictions, easements, condominium declarations, zoning exhibits, zoning lot description and/or certificate, affidavit in lieu of registration, stipulation of discontinuance, trust agreements, trustee's deed, referee's report of sale, death certificates, birth certificates, marriage certificates, surrogate court filings, executor and/or administrator filings, last will and testaments, building loan contracts, bonds, certificate of incorporation, certificate of authority, warrants, Sherrif's deed, vacate order, bankruptcy filings, etc. Additionally, or alternatively, the documents "D" received by title closer 20 and/or the documents "D" delivered to the title insurance company 30 may include a marked-up title report, copies of the title policy, documents that are to be recorded in a county clerk's office, and/or identification of the closing parties 10, such as and without limitation, the individuals directly involved in the closing transaction.

Continuing with reference to FIG. 1, during the traditional method 100 of a closing for a real estate transaction, the closing party 10 pays the title closer 20 the required funds "F" necessary to record documents "D" with the appropriate recording institutions 200 and all funds "F" necessary to pay off any fees due to designated parties 250. The appropriate recording institution 200 may include any recording institution in a given region, such as and without limitation, a register's office, a recording authority in a given municipality or region, a county clerk's office, etc. The title closer 20 in turn delivers the funds "F" and documents "D" to the title insurance company 30. The title insurance company 30 may include an accounting department 32 and a post-closing department 34. The accounting department 32 of the title insurance company 30 may include the funds "F" collected at the closing transaction by the title closer 20 from the closing party 10. The post-closing department 34 may include all of the original documents "D" collected at the closing transaction by the title closer 20 from the closing party 10 at the closing, and delivered to the title insurance company 30. The accounting department 32 of the title insurance company 30 deposits the funds "F" into a clearing account 321. Subsequent to depositing the funds "F" into the clearing account 321, and as based on a profit/loss statement (P/L statement), the appropriate funds "F" are transferred into one of three accounts 322, 323, 324 that will be issuing the funds "F" to the designated party 250, as will be described in further detail below. In particular, the profit/loss statement explains the flow of funds "F" through the various accounts and blueprints the future payments, or flow of funds "F," by the recording/escrow department. The profit/loss statement may be generated after the closing is complete or before. The profit/loss statement may detail the sum of all of the funds "F" given to the title closer 20 which will be deposited into the clearing account 321 from any or all of the closing parties 10 to the transaction, and what the total amount of funds "F" should be that will be transferred into the separate accounts, 322, 323, 324.

Continuing with reference to FIG. 1, funds "F" may be transferred from the clearing account 321 to an escrow account 322, a state sales tax account 323, and/or a recording account 324. The escrow account 322 may be an account that will be used to hold any open monies, or funds "F," to pay open municipality accounts, such as and without limitation, real estate taxes, water fees, utilities fees and/or violation fees, and/or any fees due to municipalities associated with a state, county, city, town, or village, including but not limited to the Department of Taxation and Finance, receiver of taxes, traffic department, violations bureau, water department, sewer department, building department, housing preservation department, highway department, etc. In particular, the escrow account 322 may be used to hold funds "F" due for open real estate taxes, open water/sewer fees due, open housing and building violation fees, open mortgages, open UCC financial statements, open permits, open judgments, open liens, parking tickets, state or federal tax liens, lis pendens, etc. The state sales tax account 323 may be a state sale tax account that goes directly to the state on a quarterly basis. The recording account 324 may be an account which is used to issue checks that will accompany the closing documents "D" that are to be recorded by the recording department 341, to the appropriate recording institution 200, as will be described in further detail below.

The post-closing department 34 of the title insurance company 30 may include a recording department 341. In particular, the post-closing department 34 may submit the documents "D" received by the title closer 20 from the closing transaction that will ultimately be recorded with the appropriate recording institution 200. The post-closing department 34 may review the documents "D" and/or perform quality control of the documents "D" prior to submitting the documents "D" to the recording department 341. Additionally or alternatively, the recording department 341 may review and/or perform quality control of the documents "D." The post-closing department 34 and/or the recording department 341 of the title insurance company 30 may generate cover sheets unique to each document "D" for proper filing with the appropriate recording institution 200. In particular, the post-closing department 34 and/or the recording department 341 may generate a cover sheet unique to each county and ultimately create a package that will be sent to the corresponding county clerk's office for recording, and each cover sheet may reflect the payment due to the county associate with the particular recording.

Subsequent to finalizing the cover sheets described above, the accounting department 32 issues a check, or other type of funding, from the recording account 324 based on the cover sheets and calculations that have been generated by the post-closing department 34 and/or the recording department 341. The final package, which may contain the funds "F" disbursed by the accounting department 32 and the documents "D" with cover sheets, will be sent to the appropriate recording institution 200, i.e. the county clerk. Once the documents "D" and funds "F" are delivered to the appropriate recording institution 200, i.e. the county clerk, the internal accounting department of the appropriate recording institution 200, i.e. the county clerk, will take the incoming funds "F" and disburse them to the appropriate offices and/or the designated party 250. The designated parties 250 may include parties such as and without limitation the Internal Revenue Service, state taxation departments, village taxation departments, the county clerk's office, the water department, the tax department, the violations department, the courts, parking or traffic court, local municipality departments including but not limited to the fire department, police department, etc., attorneys and lenders. Some of the funds "F" may be payments or fees due to the state and/or some of the funds "F" may be payments or fees due to the county. Subsequent to the quality control checks of the documents "D" by the appropriate recording institution 200, i.e. the county clerk, the documents "D" may be imaged for county records and the originals may be sent to an address designated on the document "D", and referred to throughout the description as the document addressee 347. The address designated may include any address that the filing party desires as a destination for the original documents "D" to be delivered subsequent to recording with the appropriate recording institution 200.

Figure 2:
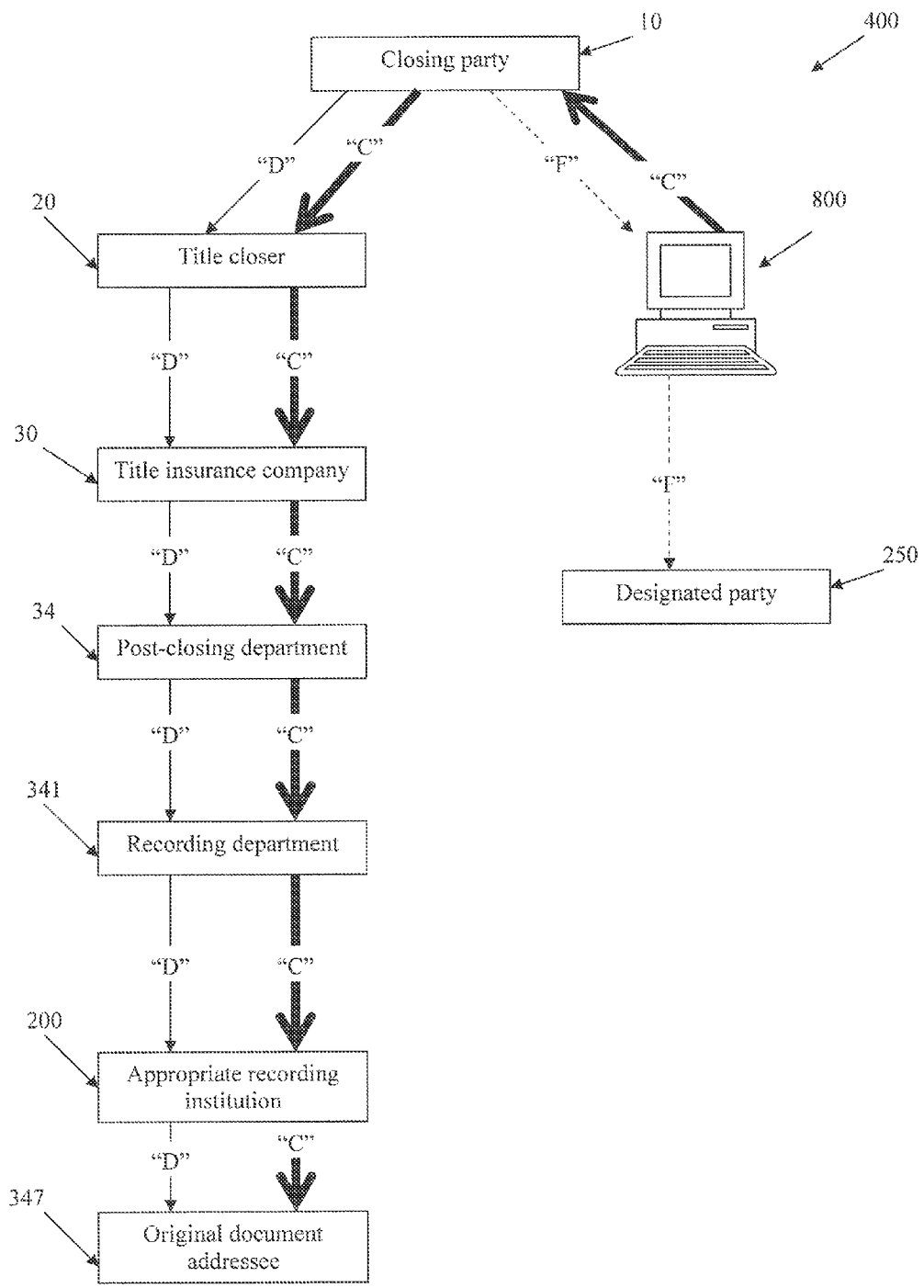
FIG. 2 is a flow chart of the transfer of funds and documents according to an embodiment of the present disclosure.

Turning now to FIG. 2, a method 400 of performing a real estate closing transaction is shown using payment system 800. In method 400, there exist the same parties present as those present in method 100, however method 400 further includes payment system 800. As described above, the closing parties 10 may include any individuals that have an interest in the transaction taking place, such as and without limitation, a buyer, seller, lender, buyer's attorney or representative, seller's attorney or representative, bank attorney, and/or any agents associated with any of the closing parties 10. The title closer 20 is an agent, i.e. representative, of the title insurance company 30. The title insurance company 30 may be a title insurance company or a title company not particularly associated with insurance policies.

In method 400, the title closer 20 receives documents "D" at the closing transaction by the closing parties 10 and title closer 20 delivers all documents "D" received at the closing transaction to the title insurance company 30, as will be described in further detail below. When the title insurance company 30 is associated with a particular insurance policy, the title closer 20 will exchange the documents "D" for the appropriate insurance policies.

Continuing with reference to FIG. 2, any of the closing parties 10, the closing agent 20, and/or the title insurance company 30 may transfer funds "F," i.e. pay some or all of the required fees due, to the designated parties 250 through the payment system 800, as will be described in further detail below. In particular, through the payment system 800, any closing party 10, the closing agent 20, and/or the title insurance company 30 may pay the recording fees to the designated party 250 corresponding to the fees associated with recording the documents "D" with the appropriate recording institutions 200. Additionally or alternatively, through the payment system 800, any closing party 10, the closing agent 20, and/or the title insurance company 30 may pay any taxes due to a designated party 250, such as and without limitation, mortgage tax, and/or transfer tax. Additionally or alternatively, through the payment system 800, any closing party 10, the closing agent 20, and/or the title insurance company 30 may pay any other fees due to designated parties 250 such as and without limitation, real estate taxes, water fees, and/or violation fees due, federal tax liens, state tax liens, real estate tax liens, mortgage tax, transfer tax, city tax, open water fees, violation fines and tickets, parking tickets, judgments, mechanic liens, and any other fee that may be due to any party.

Subsequent to transferring the funds "F," i.e. paying the fees due, to the designated party 250 through the payment system 800, the party that transferred the funds "F," i.e. the closing party 10, the title closer 20, and/or the title insurance company 30, may receive a certificate of payment "C" which is generated by payment system 800. Additionally, or alternatively, the certificate of payment "C" may be delivered to any party that the transferring party designates to receive the certificate of payment "C." The certification of payment "C" may include information which is unique to the particular closing transaction, the particular real estate involved, and/or the particular property involved. In particular, the certificate of payment "C" may include information such as and without limitation, the block and lot of the real estate property, a list or images of the documents "D" to be filed with the appropriate recording institutions 200, the funds "F" transferred to the designated parties 250, and/or any other such information that may be necessary or desired by any party such as and without limitation the amount of funds "F" transferred, the payment calculations and breakdown, the designated parties 250 and funding destination 251, the user 220, the payment method and/or funding source 221, unique authentic confirmation number, parcel identification of the property (district/section/block/lot) or social security number, purpose for payment, date and time of payment, images of all documents "D" associated with the transaction, as will be described in further detail below with reference to FIG. 7. The certificate of payment "C" may further include a confirmation that all monies required to complete the transaction, clear title, and record documents have been transferred at the closing, an image of the marked up title report, an image of the title policy, images of the documents "D" that are required to be recorded with the appropriate recording institution 200, and images identifying the individuals directly involved in the transaction, i.e. the closing parties 10.

Continuing with reference to FIG. 2, in method 400, the documents "D" received by the title closer 20 may include documents "D" that are required to be filed, or desired to be filed, by the title insurance company 30 with an appropriate recording institution 200, as will be described in further detail below. The documents "D" may include any documents associated with the real estate closing transaction. Additionally, or alternatively, the documents "D" received by title closer 20 and/or the documents "D" delivered to the title insurance company 30 may include a marked-up title report, copies of the title policy, documents "D" that are to be recorded in a county clerk's office, and/or identification of the parties 10, such as and without limitation, the individuals directly involved in the closing transaction.

Continuing with reference to FIG. 2, during the closing transaction of method 400, the title closer 20 ultimately receives the certificate of payment "C," either directly from the payment system 800 or, indirectly, from the party that transferred the funds "F," i.e. made the payment, through the payment system 800, in addition to receiving the documents "D" described above. In some situations, the title closer 20 may receive the documents "D" and certificate of payment "C" in exchange for appropriate insurance policies. Additionally or alternatively, in exchange for a mortgage instrument and certificate of payment "C," i.e. confirmation that the applicable taxes have been paid, the title closer 20 may issue a closing party 10, i.e. a lender, a mortgage policy. Additionally or alternatively, in exchange for a deed and certificate of payment "C," i.e. confirmation that the applicable transfer taxes have been paid, the title closer 20 will issue a closing party 10, i.e. a buyer, a fee policy. Alternatively, the title insurance company 30 may receive the certificate of payment "C" and/or the documents "D" directly at the closing transaction.

Upon receiving the necessary documents "D" and the certificate of payment "C," the title closer 20 delivers the documents "D" and certificate of payment "C" to the title insurance company 30. The documents "D" transmitted to the title insurance company 30 may include a confirmation that all funds "F" required to complete the transaction, clear title and record documents have been transferred at the closing, an image of the marked up title report, an image of the title policy, images of the documents "D" that are required to be recorded with the appropriate recording institution 200, and images identifying the individuals directly involved in the transaction, i.e. the closing parties 10.

The title insurance company 30 may include a post-closing department 34. The post-closing department 34 may include all of the original documents "D," including the certificate of payment "C," collected at the closing transaction by the title closer 20 from the closing party 10 at the closing, and delivered to the title insurance company 30. The post-closing department 34 of the title insurance company 30 may include a recording department 341. In particular, the post-closing department 34 may submit the documents "D" and certificate of payment "C" received by the title closer 20 from the closing transaction that will ultimately be recorded to the appropriate recording institution 200. The post-closing department 34 may review the documents "D" and certificate of payment "C" and/or perform quality control of the documents "D" and certificate of payment "C" prior to submitting the documents "D" and certificate of payment "C" to the recording department 341. Additionally or alternatively, the recording department 341 may review and/or perform quality control of the documents "D" and certificate of payment "C." The post-closing department 34 and/or the recording department 341 of the title insurance company 30 may generate cover sheets, unique to each document "D" and/or certificate of payment "C," for proper filing with the appropriate recording institution 200. In particular, the post-closing department 34 and/or the recording department 341 may generate a cover sheet unique to each county and ultimately create a package that will be sent to the corresponding county clerk's office for recording, and each cover sheet may reflect the payment due to the county associated with the particular recording in addition to the certificate of payment "C" indicating that the necessary funds "F" or fees due have been transferred to the designated parties "D," i.e. the necessary taxes have been paid to the appropriate office of the treasury, municipality, an/or county clerk through payment system 800.

Continuing with reference to FIG. 2, according to method 400, the final package containing all documents "D," the certificate of payment "C," and/or any other necessary documents that need to be recorded, such as and without limitation, collateral documents, are delivered to the appropriate recording institution 200, i.e. the county clerk's office. Once the contents of the package, i.e. the documents "D" and/or certificate of payment "C," are delivered to the appropriate recording institution 200, the contents of the package will undergo a quality control check by the appropriate recording institution 200 and will ultimately be recorded. The appropriate recording institution 200 may then image the contents of the package, i.e. the documents "D" and the certificate of payment "C," and then submit the original documents to the address designated by the recording party, i.e. the closing party 10 that recorded the documents "D," such as and without limitation, the document addressee 347.

Figure 3A:
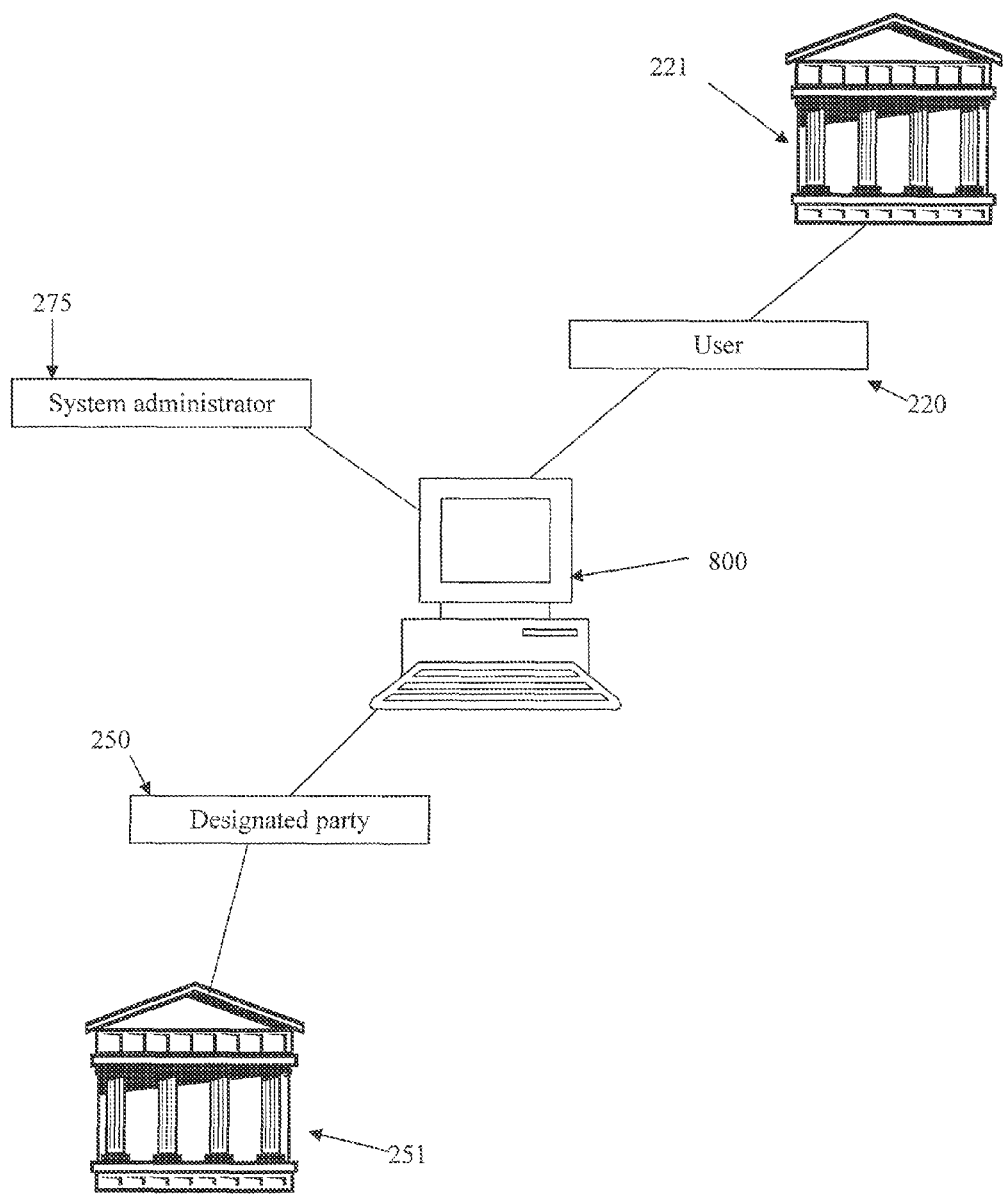
FIG. 3A is a block diagram of a payment system of according to an embodiment of the present disclosure.
Figure 3B:
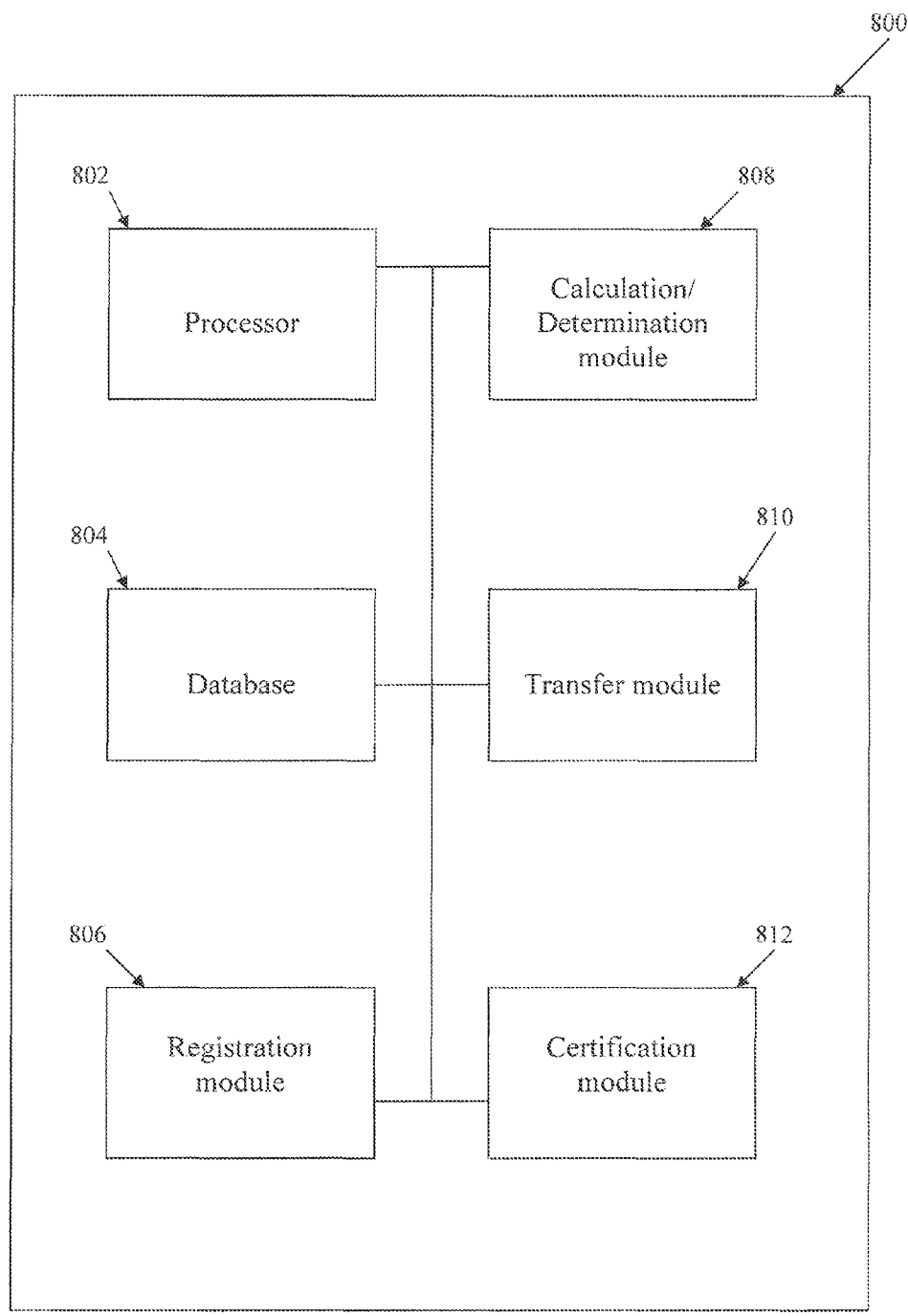
FIG. 3B is a block diagram showing the components of the payment system of FIG. 3A in accordance with an embodiment of the present disclosure.
Figure 4:
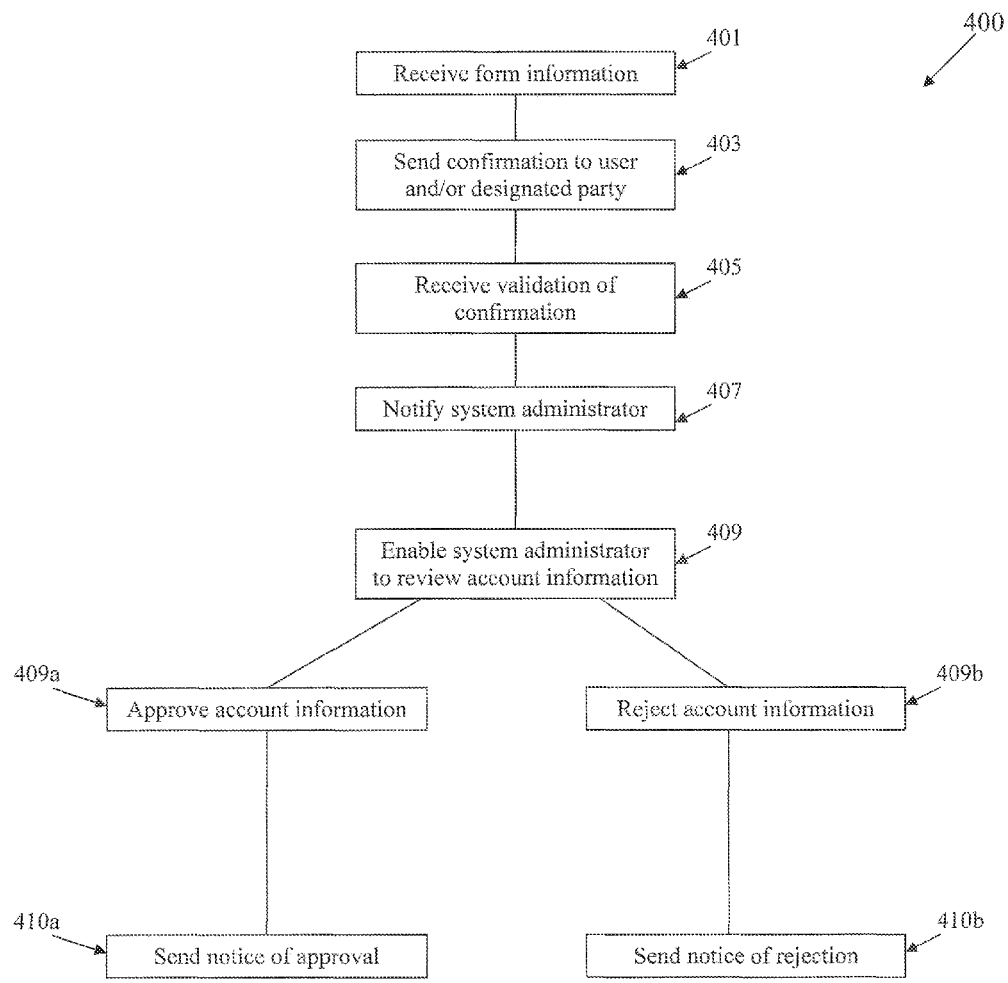
FIG. 4 is a block diagram of a registration process of the payment system of FIG. 3 in accordance with an embodiment of the present disclosure.
Figure 5:
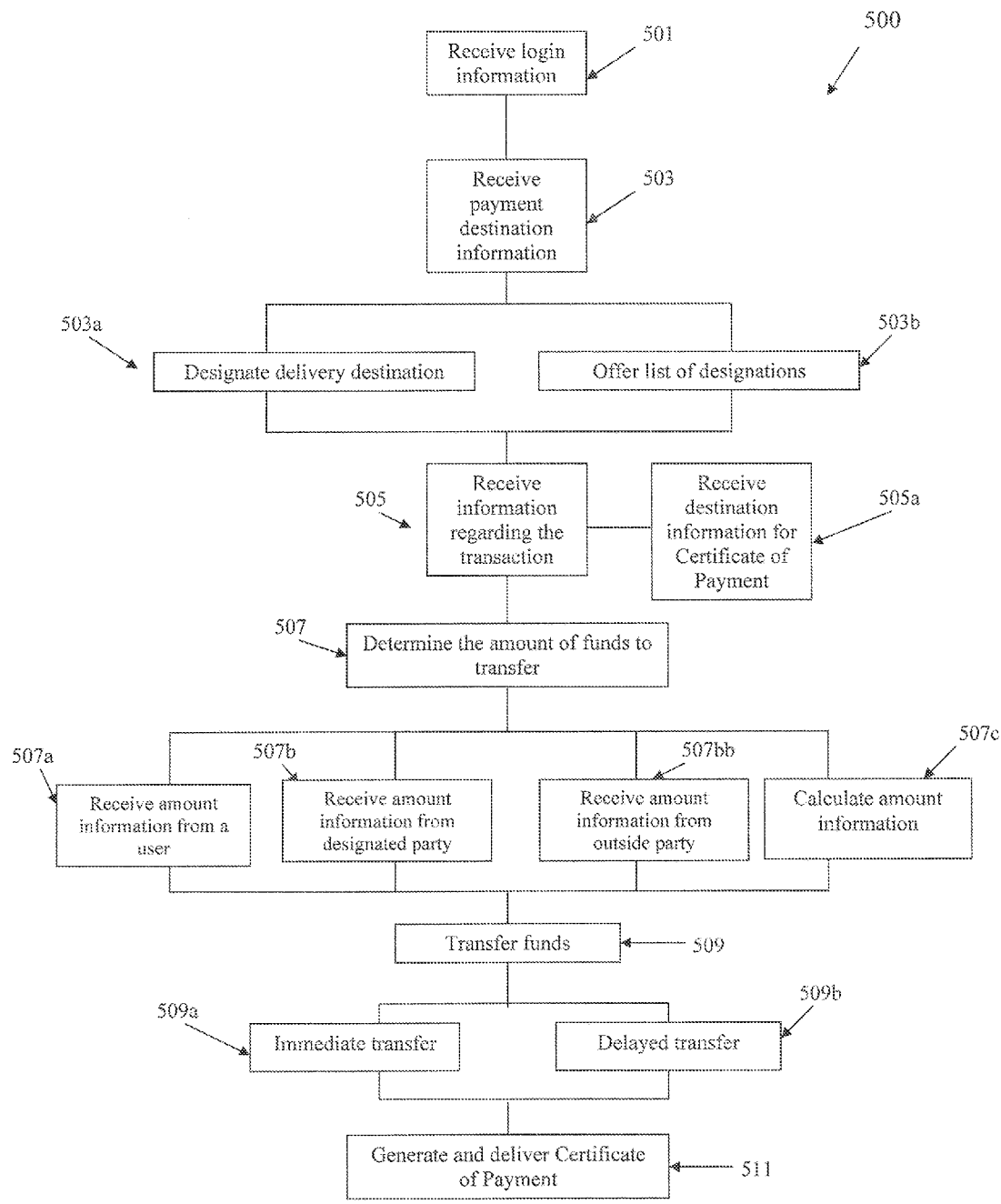
FIG. 5 is a block diagram of a method for transferring funds through the payment system of FIG. 3 in accordance with an embodiment of the present disclosure.

Turning now to FIGS. 3-5, payment system 800 will now be described in detail. With particular reference to FIGS. 3A and 3B, payment system 800 may include a processor 802, a database 804, a registration module 806, a calculation or determination module 808, a transfer module 810, and a certification module 812, each of which will be described in further detail below. It is understood, that although particular modules of payment system 800 described below are described as being configured to perform particular tasks or functions, any of the modules of payment system 800 may be capable of performing any of the tasks of any of the other modules of payment system 800. The term "module," as used herein, may include software and/or hardware, digital or analog, that cooperate to perform one or more control tasks and may include digital commands, power circuitry, networking hardware, an/or a set of programmable instructions for implementation and execution by at least one processor 802 to carry out any of the step described herein.

Continuing with reference to FIGS. 3A and 3B, the processor 802 of payment system 800 is configured to process any of the steps or functions of payment system 800 and/or any of the modules therein. The term processor, as used herein, may be any type of controller or processor, and may be embodied as one or more processors adapted to perform the functionality discussed herein. Additionally, as the term processor is used herein, a processor may include use of a single integrated circuit (IC), or may include use of a plurality of integrated circuits or other components connected, arranged or grouped together, such as controllers, microprocessors, digital signal processors, parallel processors, multiple core processors, custom ICs, application specific integrated circuits, field programmable gate arrays, adaptive computing ICs, associated memory, such as and without limitation, RAM, DRAM and ROM, and other ICs and components.

Continuing with reference to FIGS. 3A and 3B, the database 804 of payment system 800 may be configured to store information pertinent to users 220, designated parties 250 funding sources 221 of users, funding destinations 251 of designated parties 250, history of transactions, and/or any other information set by the system administrator 275, users 220, and/or designated parties 250. As used herein, the term database is understood to include, and is not limited to, repository, databank, database, cache, storage unit, cloud, and the like, a data repository, any computer or other machine-readable data storage medium, memory device or other storage or communication device for storage or communication of information, currently known or which becomes available in the future, including, but not limited to, a memory integrated circuit, or memory portion of an integrated circuit (such as the resident memory within a processor), whether volatile or non-volatile, whether removable or non-removable, including without limitation RAM, FLASH, DRAM, SDRAM, SRAM, MRAM, FeRAM, ROM, EPROM or E2PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. Additionally, or alternatively, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory may be adapted to store various look up tables, parameters, coefficients, other information and data, programs or instructions (of the software of the present invention), and other types of tables such as database tables.

Continuing with reference to FIGS. 3A and 3B, the registration module 806 of payment system 800 may be configured to register the user 220 information and/or the designated party 250 information. In particular, the registration module 806 may be configured to designate a funding source 221 of the user 220, where the funds "F" will be transferred from, as will be described in further detail below.

Continuing with reference to FIGS. 3A and 3B, the calculation or determination module 808 of payment system 800 is configured to calculate, or otherwise determine, the amount of funds "F" to be transferred from funding source 221 of user 220 to funding destination 251 of designated party 250. The amount of funds "F" to be transferred may be input by the user 220 and/or the designated party 250 into payment system 800. Additionally, or alternatively, the amount of funds "F" to be transferred may be determined by the calculation module 808 of payment system 800 by analyzing information regarding the particular closing transaction involves, such as and without limitation, the district/section/block/lot of the real estate property, or other parcel identification information, and the taxes and fees associated with that particular property that correspond to particular closing transaction.

Continuing with reference to FIGS. 3A and 3B, the transfer module 810 of payment system 800 is configured to transfer the funds "F" from the funding source 221 of user 220 to funding destination 251 of designated party 250. The transfer module 810 of payment system 800 receives the information from the determination module 808 of payment system 800 regarding the amount of funds "F" to deduct, or otherwise remove, from funding source 221 of user 220 and deposit, or otherwise transfer into, the funding destination 251 of designated party 250.

Continuing with reference to FIGS. 3A and 3B, the certification module 812 of payment system 800 is configured to generate the certificate of payment "C" and deliver the certificate of payment "C" to the user 200, as will be described in further detail below. Additionally, or alternatively, the certification module 812 may deliver the certificate of payment "C" to the designated party 250, any of the closing parties 10, the appropriate recording institution 200, and/or any other designation that the user 220 designates that the certificate of payment "C" be delivered to. The certification module 812 receives a notification from transfer module 810 that the transfer of funds "F" upon completion of the transfer of funds "F."

Turning now to FIG. 3B, there are two types of account holders that may use the payment system 800 including designated parties 250 who will be receiving funds "F" through the payment system 800 and users 220 who will be transferring funds "F," i.e. making payments, through the payment system 800. The user 220 transfers funds "F" through payment system 800 from a funding source 221. The designated party 250 receives funds "F" trough payment system 800 from the funding source 221 of the user 220, in a funding destination 251. Further, the payment system 800 may also include a system administrator 275 for overseeing, and/or otherwise controlling, the activity through the payment system 800. In one embodiment, an activated and validated account is required to access, transfer funds "F," and/or receive funds "F" through the payment system 800. However, it is also appreciated and understood that an activated and validated account is not required in order to use and/or access the payment system 800. The designated parties 250 may include for example and without limitation municipalities, county clerk's office, and any other party to which funds "F" are desired to be transferred to. The users 220 may include any party to the closing transaction including, for example and without limitation, closing parties 10 and any other party that desires to make a payment through payment system 800.

Continuing with reference to FIG. 3B, as described above, users 220 transfer funds "F" from funding source 221 through payment system 800 into a funding destination 251 of the designated party 250. Funding source 221 may include any means by which funds "F" may be transferred, such as and without limitation, electronic transfer, wire transfer, money order, credit card payment, debit card payment, check-image payment, and/or withdrawal from banking institution, or any other such electronic or non-electronic means of transfer known in the art. The funds "F" that are transferred from the funding source 221 of the user 220 are transferred to the designated party 250 through payment system 800. More particularly, the funds "F" are transferred to a funding destination 251 of the designated party 250. The funding destination 251 may include any means by which funds "F" may be received, such as and without limitation, electronic retrieval, wire retrieval, credit retrieval, debit retrieval, and/or banking institution.

Turning now to FIG. 4, designated parties 250, and/or users 220, may initially be required to register with the payment system 800. Registration 400 may consist of receiving form information 401 including information relating to banking information, such as and without limitation, information regarding the funding destination 251 and/or funding source 221, and choosing a username and password. In particular, during the registration 400 process, the designated party 250 may begin by completing a form 401. The step of receiving form information 401 may include the user 220 and/or designated party 250 inputting necessary identification information, funding source 221 information, and/or funding destination 251 information, i.e. funding sources that may be available for transferring future or current funds "F" and/or funding retrieval destinations for receiving funds "F" transferred by others. The identification information may include name, address, phone numbers, email addresses, and any other identification information that may be necessary for a transaction to be completed such as an without limitation, company name, address, city, county, state, zip code, contact name, e-mail address, office phone or other telephone contact information, username, password, password reminder, type of firm, type of payments, banking institution, routing number, account number or other funding sources 221 and/or funding destinations 251, etc. The fund "F" retrieval methods may include a banking institution, or banking institutions, that the designated party 250 would like their account associated with, i.e. to receive the payment to. Payment system 800 may further include pre-programmed banking institutions that a user 220 or designated party 250 may select from. Additionally or alternatively, the payment methods, i.e. funding source 221, may include any form of payment such as credit card, debit card, image check retrieval, cash, wire or other similar electronic transfer, and/or other fund "F" transfer methods known in the art, and/or any combinations thereof. Additionally, all registration 400 information may be stored in database 804 of payment system 800 via the processor 802 for use during future transactions.

Continuing with reference to FIG. 4, when the step of receiving the form information 401 is complete, the payment system 800 may send a confirmation of complete registration 403, i.e. automatically send the designated party 250 and/or user 220 a confirmation that the registration has been completed. The confirmation may include, for example and without limitation, a link or other message sent via email, or other electronic means, to validate the account of the designated party 250 and/or verify, or otherwise confirm, that the email address and/or other information provided by the designated party 250 does in fact belong to the designated party 250. It is envisioned that the validation link, or other confirmation, may be encrypted as a security measure.

Continuing with reference to FIG. 4, subsequent to receiving the confirmation of complete registration, described in step 403, the payment system 800 receives a validation of confirmation, as illustrated by step 405. The validation may be received by the designated party 250 and/or user 220 validating the confirmation by, for example and without limitation, approving a link supplied by the system administrator 275. Upon receiving a validation of the confirmation 405, an email, and/or other electronic notification, is then sent to the system administrator 275 at step 407 so that the system administrator 275 may validate, i.e. review and confirm, the information submitted by the designated party 250 and/or user 220.

Continuing with reference to FIG. 4, subsequent to sending a notification 407 to the system administrator 275, the system administrator 275 may then access the control panel and review the account information 409 supplied by the designated party 250 and/or user 220. The system administrator 275 may then either approve 409a or reject 409b the account information. If the system administrator 275 approves the account information 409a, then a notification of approval is sent 410a to the designated party 250 and/or user 221 of such approval and the account is activated. Alternatively, if the system administrator 275 rejects the account information 409b, then a notification of rejection is sent 410b to the designated party 250 and/or user 221. Upon approval by the system administrator 275, the system administrator 275 will activate the account and an activation notification is then delivered to the designated party 250 and/or user 221.

Additionally, users 220 may also register with the payment system 800 in a similar manner as described above with respect to the registration 400 of designated parties 250. The registration information may be stored in database 804 of payment system 800, however, it is envisioned that registration information may be stored by other means or in other locations. In particular, if a user 220 registers with the payment system 800, then the payment system 800 may store the user's 220 information including information pertaining to funding source 221 or methods of payment, i.e. where the funds "F" will be transferred from. With the information stored, a user 220 may select from previously used payment methods of funding sources 221 for making current or future payments to designated parties 250 through payment system 800.

Turning now to FIG. 5, once the user 220 has access to the payment system 800, the user 220 may proceed to transfer funds "F" from funding source 221, i.e. make a payment, to a designated party 250 or multiple designated parties 250, i.e. a funding destination 251 or multiple funding destinations 251. The method of transferring funds "F" 500 via the payment system 800 will now be described in detail with reference to FIG. 5. It is understood that the method of transferring funds "F" 500, described below, although described in a particular order and with particular steps, may be completed with additional steps and/or in an order other than the order as described below.

The method of transferring funds "F" 500 begins by the payment system 800 receiving login information at step 501. Payment system 800 may receive login information by a user 220 logging in to the payment system 800 and entering information. During the logging in step of 501, the user 220 may input identification information into the payment system 800. The receiving login information of step 501 may further include the payment system 800 authenticating the login information provided by the user 220, or otherwise received. The step of receiving login information 501 may further include designated a funding source 221 of which the funds "F" will be transferred from.

Continuing with reference to FIG. 5, subsequent to successfully logging in to the payment system 800, the payment system 800 may then receive payment destination 251 information at step 503. Step 503 may be accomplished by several means such as, and without limitation, a user 220 inputting a payment destination 251 into payment system 800. The step of receiving a payment destination 251 may include the user 220 designating when and where the funds "F" are to be delivered, as illustrated by step 503*a*. Additionally or alternatively, the step of receiving payment destination information 503 may include a user 221 selecting a designated party 250 from a list of designated parties 250 which are included, illustrated at step 503*b*, or otherwise stored, in the payment system 800 database 804. Once, the destination has been inputted 503*a* or selected 503*b*, the designated party 250 has been established and it is known when and where the funds "F" will be transferred.

Continuing with reference to FIG. 5, once the designated party 250 is known, i.e. inputted and/or selected, or otherwise received by system 800, the payment system 800 may receive information regarding the transaction, as illustrated at step 505. One method for receiving the information regarding the transaction is by the user 220 inputting information regarding the transaction. The step of receiving the information regarding the transaction 505 may include receiving information pertaining to the particular real estate closing transaction, for example and without limitation, the real property at issue, the district, section, block, and/or lot of the real property, the date and time of the closing transaction, the state, county, address of the real property, the type of property, municipality/town, village, type of transaction, the designated parties 250 for recording tax payments, the designated parties 250 for real estate tax payments, the designated parties 250 for water/sewer payments, the designated parties 250 for violation/ticket payments, and other designated parties 250, and/or amount of funds "F" due to any designated party 250, the payment details, for example funding source 221, such as and without limitation, the company issuing check, the file/title number, the banking institution, the check number, the account number, the routing number, the total payments, the applicable document identification number, and the county confirmation number. Additionally, payment system 800 may then receive certificate of payment "C" destination information, as illustrated at step 505*a*. Payment system 800 may receive the certificate of payment "C" destination information by the user 220 and/or the designated party 250, inputting certificate of payment "C" destination information 505*a* into payment system 800. The destination information received at step 505*a* may be used by the payment system 800 to determine where the certificate of payment "C" will be delivered upon the completion of the funds "F" transfer, as will be described in further detail below. The destinations for delivering the certificate of payment "C" may include the user 220, any closing parties 10, any appropriate recording institutions 200, and/or any other destinations that the user 220 would like the certificate of payment "C" to be delivered.

Continuing with reference to FIG. 5, the next step is to determine the amount of funds "F" to be transferred, as illustrated at step 507. Determining the amount to be transferred 507 may be accomplished by several means, as will be described in further detail below, for example and without limitation, payment system 800 receiving information from the user 220 regarding the amount of funds "F" to transfer, as illustrated at step 507*a*, the payment system 800 receiving information from the designated party 250 regarding the amount of funds "F" to transfer, as illustrated by step 507*b*, and/or the payment system 800 calculating the amount of funds "F" to transfer, as illustrated by step 507*c*. Additionally, step 507 may be accomplished by a combination of any or all of steps 507*a*, 507*b*, and 507*c*.

In particular, a user 220 may input the amount to be paid 507*a* by having previously calculated the amount of funds "F" due to the designated parties 250. In step 507*a*, the system 800 receives information indicating the amount of funds "F" due to each designated party 250 from the user 220. The user 220 may calculate this amount from a figure obtained by the title insurance company 30, or by any other means, which dictates what taxes, open items, fees, etc., may need to be collected in order to successfully record the documents "D" associated with the transaction and issue the new owner or lender a clear title.

Additionally or alternatively, the payment system 800 may receive information regarding the amount of funds "F" to transfer by the designated party 250 inputting the amount of funds "F" to transfer 507*b*, by calculating the amount due with respect to a particular transaction, i.e. a particular real estate closing transaction and/or a particular property involved in the transaction. In particular, at step 507*b* the payment system 800 receives information from each of the designated parties 250 indicating the amount of funds "F" that are due to each designated party 250. In step 507*b* the payment system 800 may receive a notification of a transaction from a user 220. The notification of the transaction may include information corresponding to the particular real estate closing transaction and property associated with the closing. Subsequent to receiving the notification of the transaction from the user 220, the payment system 800 may then notify the appropriate designated parties 250 of the closing transaction that is or will take place. Subsequent to notifying the designated parties 250, the payment system 800 may then receive a notification from each designated party 250 of the amount of funds "F" that are due to that particular designated party 250 and the reasons for which that amount is due. Subsequent to receiving a notification of the amount due to each designated party 250, the payment system 800 may then notify the user 220 of the amount of funds "F" due to each of the designated parties 250 and may further include the reasons for those amounts due. The user 220 may then log in to the payment system 800 and view all of the fees due to each designated party 250 before transferring the funds "F" to each designated party 250.

Additionally or alternatively, at step 507*bb*, the payment system 800 may receive the amount of funds "F" to transfer by receiving the amount information from an outside party other than the designated party 250. For example and without limitation, many institutions have systems which generate unique transaction identification numbers which correspond to transfer documents for transactions. In step 507*bb*, a user 220 may enter or otherwise input the unique transaction identification number into payment system 800, or payment system 800 may otherwise receive the unique transaction identification number. Subsequent to receiving the unique transaction identification number, payment system 800 may then notify the outside party of the transaction taking place to receive the payment information, or any other information, from the outside source. An outside source may include, for example and without limitation, an automated city register information system similar to the Automated City Register Information System (ACRIS) used in New York City.

Additionally, or alternatively, as shown in step 507*c* the payment system 800 may calculate the amount due to the designated party 250 by reviewing and analyzing the information regarding the transaction received in step 505. In particular, payment system 800 may include transactional formulas for each designated party 250 based on the specific method of taxing documents for each corresponding designated party 250. The system 800 may use information such as, and without limitation, the building type, zoning classification, allowed occupancy, designated use, purchase price, sale price, mortgage amount, owners residential status, etc., to calculate, or otherwise generate, the required amounts due based on the information provided.

Continuing with reference to FIG. 5, subsequent to determining the amount to be transferred 507, system 800 may proceed to step 509 where the funds "F" are either transferred immediately, as illustrated by step 509*a*, or the funds "F" are transferred after a delay, as illustrated by step 509*b*. The step of transferring the funds "F" 509 may include removing the funds "F" from the funding source 221 previously chosen, and transferring the funds "F" into the desired funding destination 251, i.e. banking institution, designated by the designated party 250. Additionally, or alternatively, the step of transferring the funds "F" 509 may include removing the funds "F" from the funding source 221 of the user, and transferring the funds "F" into a funding account of the payment system 800 for the purpose of delivering in bulk to the designated parties 250. The payment system 800 may charge a fee for this service upon completing the transfer of funds step 509, or earlier or later in the method of making the payment 500.

In particular, at step 509*a*, system 800 receives the funds "F" from the funding source 221 of the user 220. Upon receiving the funds "F" from the user 220, the system immediately delivers the funds "F" to the funding destination 251 of the designated party 250. Alternatively, or additionally, at step 509*b*, system 800 may collect the funds "F" from the funding source 221 of the user 220 and may store the funds "F" within system 800 for a predetermined period of time. Subsequent to the passing of that predetermined period of time, the system 800 may then finalize the transfer by depositing the funds "F" into the funding destination 251 of the designated party 251. Additionally or alternatively, the system 800 may transfer funds "F" associated with multiple transactions to a single designated party 250, in a bulk transfer. This may eliminate the need of multiple transfers between different users 220 to the same designated party 250 through system 800.

Continuing with reference to FIG. 5, subsequent to successfully transferring the funds "F" 509, the payment system 800 generates and delivers the certificate of payment "C" to the destinations designated in step 505*a*, as illustrated in step 511. As discussed above, the destinations for delivering the certificate of payment "C" may include the user 220, any of the closing parties 10, and/or any appropriate recording institutions 200. The certificate of payment "C" may include information such as the information described below with reference to FIG. 7.

Figure 6:
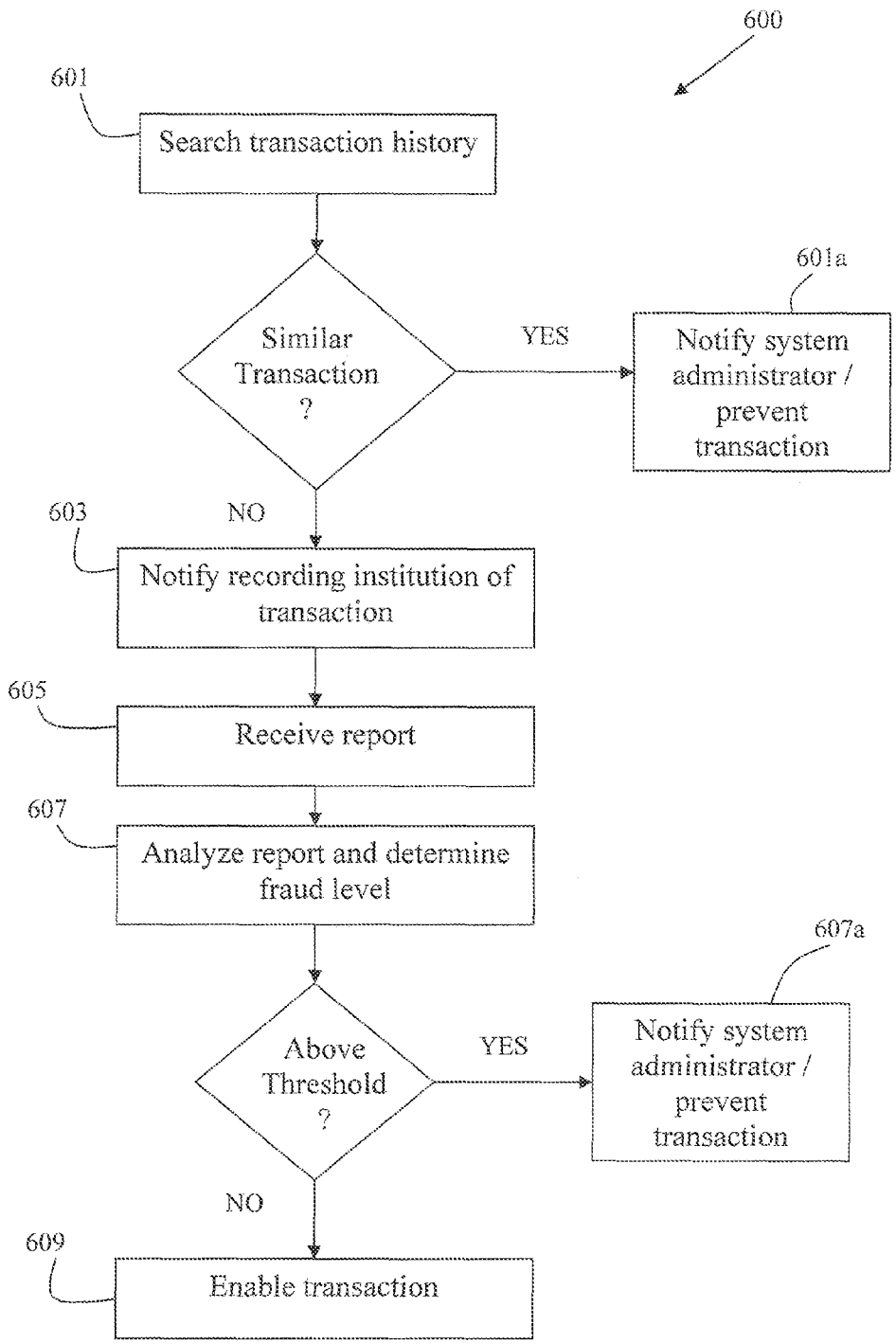
FIG. 6 is a flow chart of a system for fraud prevention according to an embodiment of the present disclosure.

Turning now to FIG. 6, at any point during method 500, payment system 800 may undergo a fraud detection process 600. Fraud detection process 600 begins by searching the history of payment system 800 for similar or identical transactions taking place (shown as step 601). At step 601, payment system 800 searches its history of activity to determine if the information associated with the particular transaction includes information similar or identical to the transaction at hand. If payment system 800 determines that a similar or identical transaction has recently taken place at step 601, for example and without limitation, within one week, then payment system 800 will deliver a notification to the system administrator 275 of potential fraudulent activity (shown as 601*a*). Further to notifying the system administrator 275, payment system 800 may additionally, or alternatively, cease the continuation of method 500 or otherwise prevent a payment to be made through payment system 800. On the other hand, if the payment system 800 does not detect any similar or identical transactions taking place at step 601, then payment system 800 will proceed to step 603.

Continuing with reference to FIG. 6, subsequent to determining that no similar or identical transactions exist at step 601, payment system 800 delivers a notification to any or all of the appropriate recording institutions 200, the designated parties 250, and/or any other authorities which may include information that transactions have taken place, or are taking place, with respect to a particular real estate property (shown as step 603). Subsequent to delivering the notification at step 603, payment system 800 receives a report from the designated party 250, the appropriate recording institution 200, and/or other party where the notification was delivered, including information as to whether there is currently, or has recently been, another transaction involving the particular real estate property at hand (shown as step 605). Subsequent to receiving the report at step 605, payment system 800 then analyzes the report to determine if another transaction is taking place with regard to the particular real estate property and determines a level of fraud (shown as step 607).

Continuing with reference to FIG. 6, if the level of fraud determined in step 607 is above a predetermined threshold, then payment system 800 proceeds to step 607*a*. At step 607*a*, payment system 800 notifies the system administrator 275 of potential fraudulent activity, and may also prevent the transaction from continuing through payment system 800. On the other hand, if the level of fraud determined in step 607 is below a predetermined threshold, then the transaction is permitted to continue (shown as step 609).

Throughout the entire process, any data entry page (whether to login, register or create a transaction) may on a Secure Socket Layer (SSL) secured page with 256-bit encryption. Furthermore, all sensitive data entered in to the database may be encrypted and kept in a robust MySQL database. The data may be mirrored and backed up for redundancy on a private network with only the required ports open through a secure VPN channel for system maintenance. There will also be a log file updated with every interaction for monitoring activity on the system.

Figure 7:
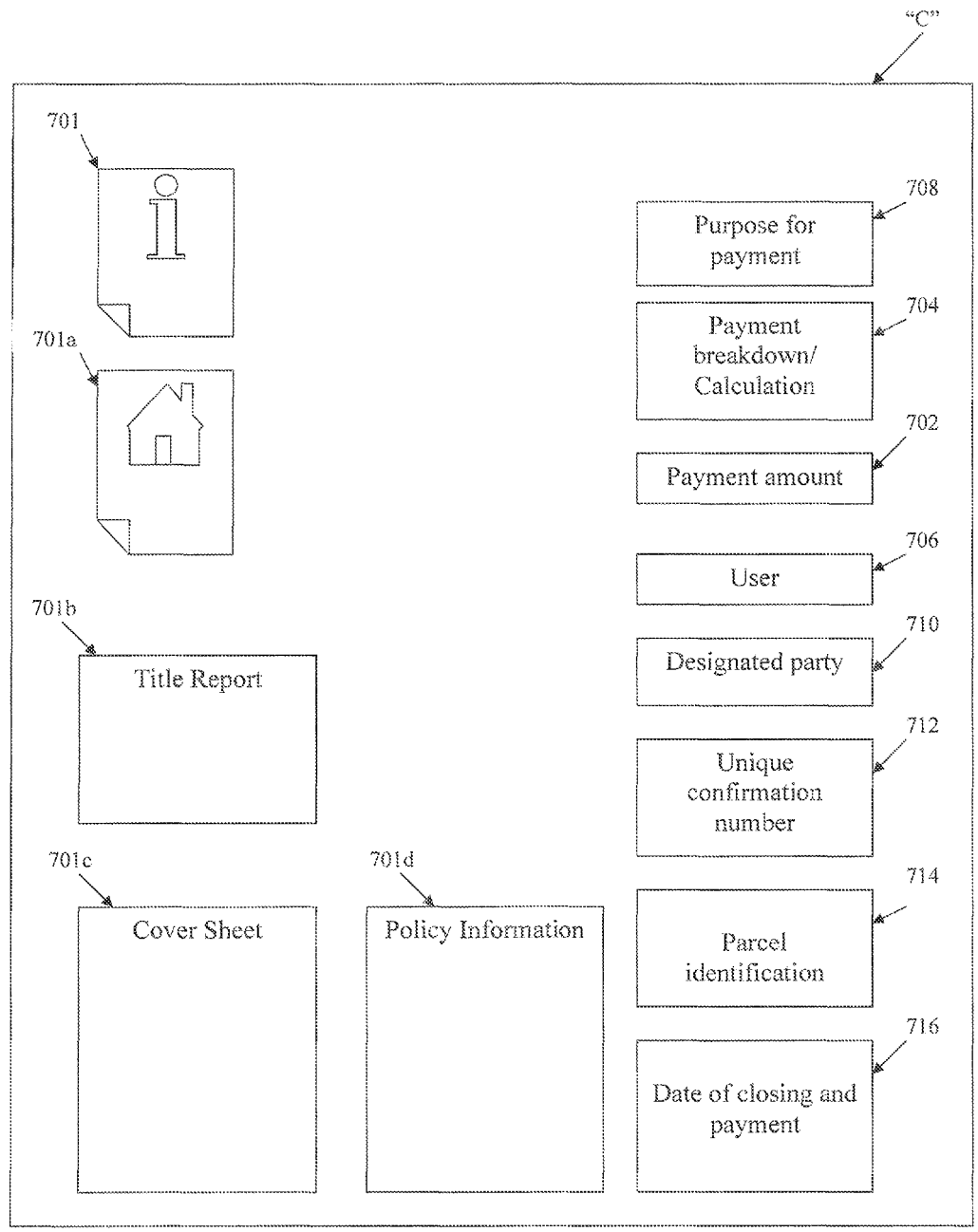
FIG. 7 is a view showing an example of a certificate of payment in accordance with an embodiment of the present disclosure.

Turning now to FIG. 7, a sample certificate of payment "C" is shown. The certificate of payment "C" shown in FIG. 7 is for illustrative purposes only and may include some, all, or more of the elements described. The certificate of payment "C" may include information such as and without limitation, the block and lot of the real estate property, a list or images of any or all of the documents "D" 701 to be filed with the appropriate recording institutions 200 images of the real estate property 701a, the funds "F" transferred to the designated parties 250, and/or any other such information that may be necessary or desired by any party such as and without limitation the amount of funds "F" transferred 702, the payment calculations and breakdown 704, the designated parties 250 and funding destination 251 (shown as 710), the user 220 (shown as 706), the payment method and/or funding source 221, unique authentic confirmation number 712, parcel identification of the property (district/section/block/lot) or social security number 714, purpose for payment 708, date and time of payment 716, images of all documents "D" associated with the transaction 701, etc. In particular, the certificate of payment "C" may further include a marked up title report or images of a marked up title report 701b. Additionally, certificate of payment "C" may further include cover sheets and/or templates unique to the particular region associated with the real estate property (shown as 701c, such as and without limitation a New York City ACRIS cover sheet. Additionally, or alternatively, the certificate of payment "C" may further include title policy information (shown as 701d) which may include information such as and without limitation the title number, policy number, insuring underwriter, and contact information or other information.

Although, the above-described embodiments have been described as being applicable to real estate closing transactions, it is envisioned that any of the above-described embodiments may be implemented in any payment system and may be used to transfer funds from any party not described above, to any party not described above. For example and without limitation, payment system 800 may be used by and for payment of traffic tickets, utility bills, cable/telephone/internet bills, medical bills, state & federal taxes, rent payments, mortgage payments, insurance bills, car payments, college tuition, and practically any bill that is currently being paid via credit card or bank checks.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A real estate closing payment system for transferring funds of at least one closing party to at least one municipality, wherein the funds are associated with fees due with respect to a particular real estate property, comprising:
   a registration module configured to receive information corresponding to the at least one closing party and at least one funding source;
   a calculation module configured to calculate an amount of funds due to at least one municipality;
   a transfer module configured to transfer the amount of funds from at least one funding source of at least one closing party to the municipality; and
   a certification module configured to:
      receive images of documents corresponding to the particular real estate property, the images of documents including:
         an image of a title report corresponding to the particular real estate property;
         an image of documents that will be delivered to the at least one municipality corresponding to the particular real estate property; and
         an image of the particular real estate property;
      generate a certificate of payment, the certificate of payment displaying the received images of documents;
      determine a delivery designation for the generated certificate of payment; and
      deliver the certificate of payment to the designated delivery destination after the amount of funds is transferred from the at least one funding source of the at least one closing party to the municipality.

2. The real estate closing payment system of claim 1, wherein the determined delivery designation is at least one recording institution and the certification module is further configured to deliver the certificate of payment to the determined at least one recording institution for recording.

3. The real estate closing payment system of claim 2, wherein the recording institution is an office of a county clerk.

4. The real estate closing payment system of claim 1, wherein the received images of documents further includes parcel identification information of the particular real estate property.

5. A method for transferring funds of a closing party in a real estate closing transaction to a municipality, wherein the funds are associated with fees due with respect to a particular real estate property, comprising:
   registering information corresponding to the closing party and a funding source;
   calculating an amount of funds due to the municipality;
   transferring the funds from the funding source to the municipality;
   receiving images of documents corresponding to the particular real estate property, the images of documents including:
      an image of a title report corresponding to the particular real estate property;
      an image of documents that will be delivered to the at least one municipality corresponding to the particular real estate property; and
      an image of the particular real estate property;
   determining a delivery designation for the generated certificate of payment;
   generating a certificate of payment, the certificate of payment displaying the received images of documents; and
   delivering the certificate of payment to the determined delivery designation after the funds are transferred from the funding source to the municipality.

6. The method according to claim 5, wherein the determined delivery designation is an appropriate recording institution and further comprising delivering the certificate of payment to the appropriate recording institution.

7. The method according to claim 6, wherein the appropriate recording institution is an office associated with a county clerk.

* * * * *